United States Patent
Chen et al.

(10) Patent No.: US 7,357,643 B1
(45) Date of Patent: Apr. 15, 2008

(54) CARD CONNECTOR ASSEMBLY ADAPTED FOR USE WITH DIFFERENT WIRELESS MODULE CARDS

(75) Inventors: Yu-Chi Chen, Taichung (TW); Chung-Yi Lee, Changhua Hsien (TW)

(73) Assignee: Micro-Star International Co., Ltd. (TW)

( * ) Notice: Subject to any disclaimer, the term of this patent is extended or adjusted under 35 U.S.C. 154(b) by 0 days.

(21) Appl. No.: 11/768,486

(22) Filed: Jun. 26, 2007

(51) Int. Cl.
  *H01R 12/00* (2006.01)
(52) U.S. Cl. ......................................... 439/65; 439/638
(58) Field of Classification Search ................ 439/65, 439/638; 361/778
See application file for complete search history.

(56) References Cited

U.S. PATENT DOCUMENTS 6,690,584 B2 * 2/2004 Uzuka et al. ................. 439/65
2005/0079743 A1 * 4/2005 Hou et al. ..................... 439/65
2007/0168648 A1 * 7/2007 Mardiks et al. ............... 712/36
2007/0283057 A1 * 12/2007 Brumfield ..................... 710/62

* cited by examiner

*Primary Examiner*—Tho D. Ta
(74) *Attorney, Agent, or Firm*—Ostrolenk, Faber, Gerb & Soffen, LLP

(57) ABSTRACT

A card connector assembly is adapted for use with a plurality of different wireless module cards, and a SIM card, and includes a first card connector mounted on a side of a circuit board and adapted to be connected electrically to a motherboard of a portable computer. A second card connector is mounted on the circuit board, is connected electrically to the first card connector, and is adapted for connecting electrically with one of the wireless module cards such that the motherboard of the portable computer is able to access the wireless module card via the first and second card connectors. A SIM card connector is mounted on the circuit board, is connected electrically to the second card connector, and is adapted for connecting electrically with the SIM card.

12 Claims, 3 Drawing Sheets

CARD CONNECTOR ASSEMBLY ADAPTED FOR USE WITH DIFFERENT WIRELESS MODULE CARDS

CROSS-REFERENCE TO RELATED APPLICATION

This application claims priority of Taiwanese Application No. 096112065, filed on Apr. 4, 2007.

BACKGROUND OF THE INVENTION

1. Field of the Invention

The invention relates to a card connector, more particularly to a card connector assembly adapted for use with different wireless module cards and a SIM card.

2. Description of the Related Art

In view of a current trend toward a smaller size for a portable computer, mini cards have been developed, wherein a PCI-Express mini card has the same specification as that of the current PCI-Express card except the size. That is, the PCI-Express mini card has a PCI-Express interface as well as a USB interface, such as a USB2.0 interface. Currently, there are provided wireless module mini cards that include a 3G mini card using the USB2.0 interface, a wireless network mini card, such as Intel 3945ABG802.11a/b/g using the PCI-Express interface, or MSI MN54G802.11b/g using the USB2.0 interface, and a TV tuner mini card.

However, most conventional notebook computers are currently not suited for use with the wireless module mini cards because of the lack of a mini card connector. Even if a mini card connector is built into a notebook computer, only a certain wireless module mini card can be connected to the mini card connector such that expansibility of the mini card connector is limited.

SUMMARY OF THE INVENTION

Therefore, the object of the present invention is to provide a card connector assembly that is adapted for use with different wireless module cards so as to overcome the aforementioned drawbacks of the prior art.

According to the present invention, there is provided a card connector assembly adapted for use with a plurality of different wireless module cards, and a SIM card. The card connector assembly comprises:

a circuit board;

a first card connector mounted on a side of the circuit board and adapted to be connected electrically to a motherboard of a portable computer;

a second card connector mounted on the circuit board, connected electrically to the first card connector, and adapted for connecting electrically with one of the wireless module cards such that the motherboard of the portable computer is able to access said one of the wireless module cards via the first and second card connectors; and a SIM card connector mounted on the circuit board, connected electrically to the second card connector, and adapted for connecting electrically with the SIM card.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
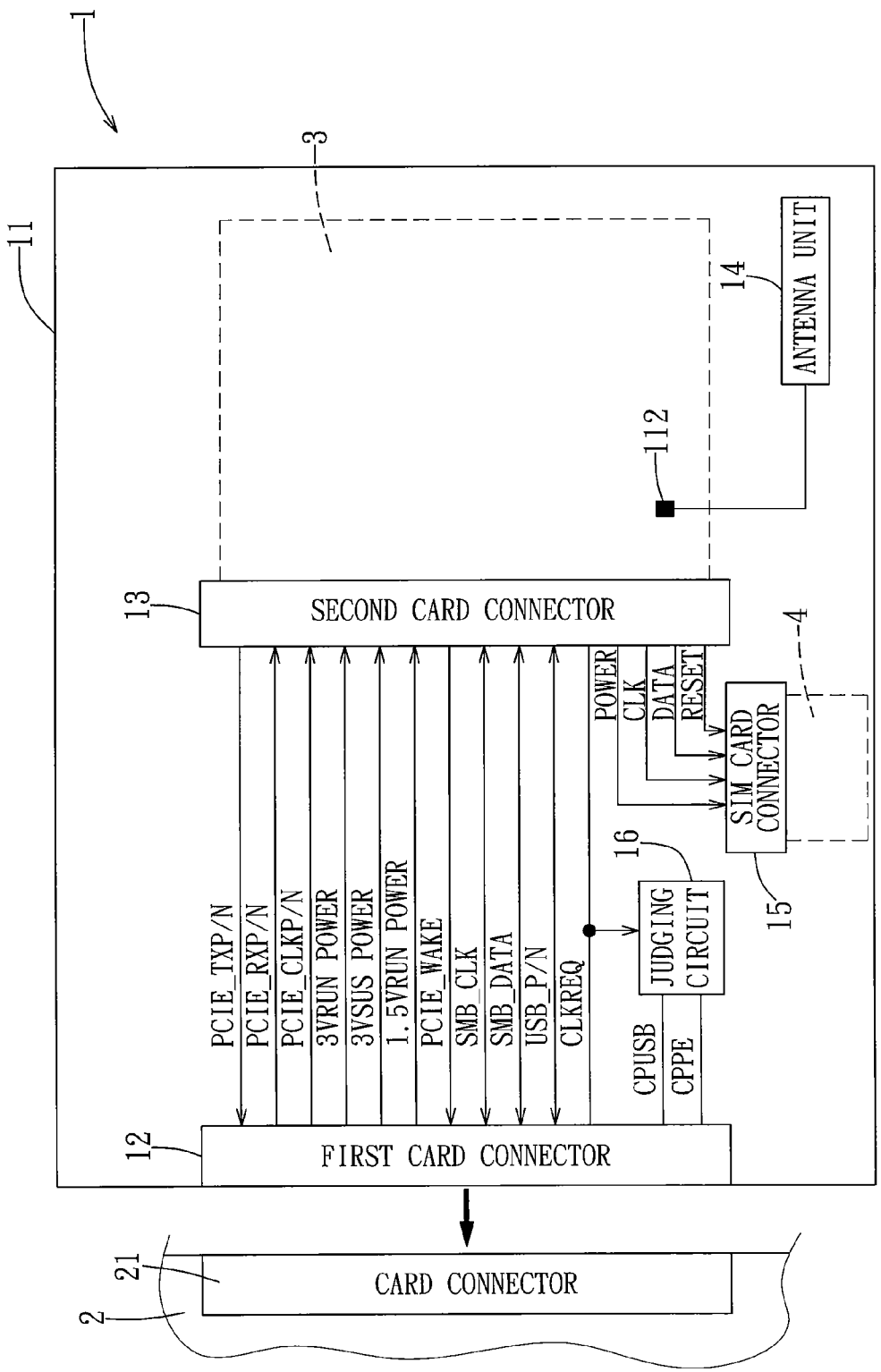
FIG. 1 is a schematic circuit block diagram illustrating the first preferred embodiment of a card connector assembly according to this invention.

Before the present invention is described in greater detail, it should be noted that like elements are denoted by the same reference numerals throughout the disclosure.

Referring to FIG. 1, the first preferred embodiment of a card connector assembly 1 according to the present invention is shown to be adapted for use with a plurality of different wireless module cards 3 (only one is shown), such as a 3G mini card, a TV tuner mini card, and a wireless network mini card, and is further adapted for use with a SIM card 4. The card connector assembly 1 includes a circuit board 11, a first card connector 12, a second card connector 13, a SIM card connector 15, an antenna unit 14, and a judging circuit 16.

In this embodiment, the circuit board 11 is a rectangular printed circuit board that has a size of 139 mm (length)×47.5 mm (width).

The first card connector 12 is mounted on a side of the circuit board 11, and is adapted to be connected electrically to an external card connector 21 on a motherboard 2 of a portable computer (not shown). In this embodiment, each of the external card connector 21 and the first card connector 12 is a PCI-Express card connector capable of supporting a PCI-Express interface and a USB interface, such as a USB2.0 interface.

The second card connector 13 is mounted on the circuit board 11, is connected electrically to the first card connector 12, and is adapted for connecting electrically with one of the wireless module cards 3 such that the motherboard 2 of the portable computer is able to access said one of the wireless module cards 3 via the first and second card connectors 12, 13. In this embodiment, the second card connector 13 is a mini PCI-Express card connector having a size smaller than that of the first card connector 12.

The circuit board 11 has a conductive contact 112 disposed adjacent to the second card connector 13 and adapted to contact electrically a corresponding conductive contact (not shown) of said one of the wireless module cards 3 when said one of the wireless module cards 3 is connected electrically to the second card connector 13.

The SIM card connector 15 is mounted on the circuit board 11, is connected electrically to the second card connector 13, and is adapted for connecting electrically with the SIM card 4. As such, data stored in the SIM card 4 can be transmitted to said one of the wireless module cards 3 via the SIM card connector 15 and the second card connector 13.

The antenna unit 14 is disposed on the circuit board 11, and is connected electrically and wiredly to the conductive contact 112 of the circuit board 11 such that the antenna unit 14 is adapted to be connected electrically to said one of the wireless module cards 3 when said one of the wireless module cards 3 is connected electrically to the second card connector 13. In this embodiment, the antenna unit 14 is a multi-frequency band antenna that is mounted on the circuit board 11 and that is suitable for the different wireless module cards 3.

Figure 2:
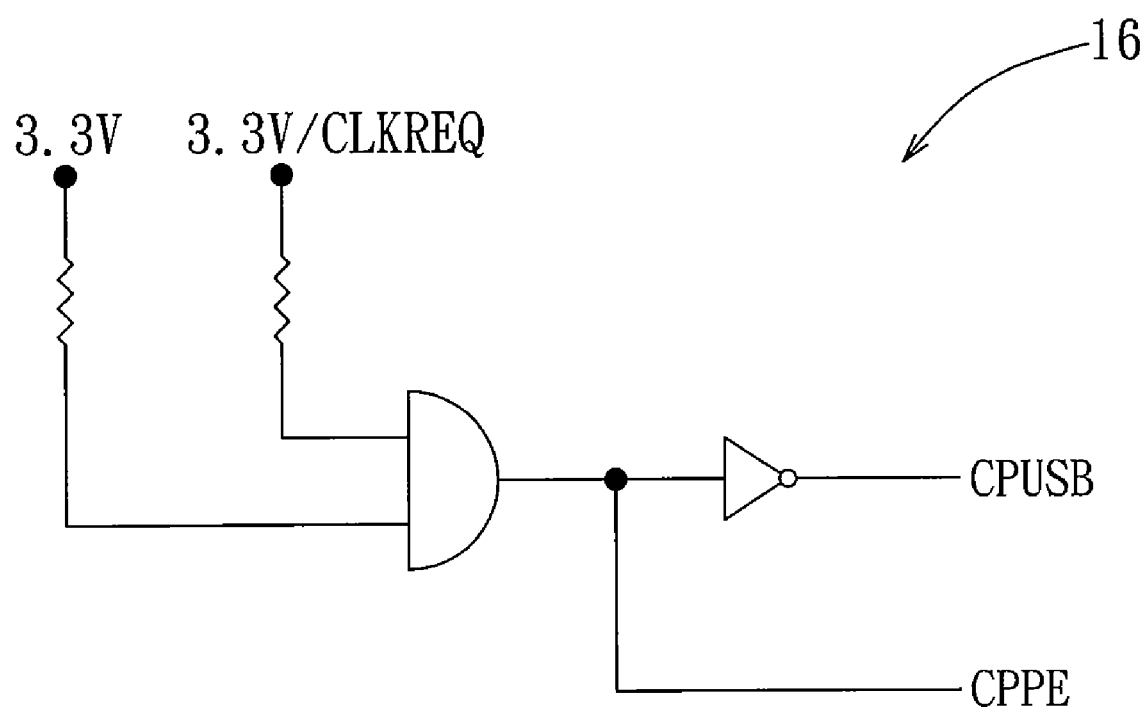
FIG. 2 is a schematic electrical circuit diagram illustrating a judging circuit of the first preferred embodiment.

The judging circuit 16 is mounted on the circuit board 11, and is connected electrically to the first and second card connectors 12, 13. The judging circuit 16 detects whether the second card connector 13 outputs a clock request signal (CLKREQ) to the first card connector 12 when the second card connector 13 is connected electrically to said one of the wireless module cards 3, and outputs a judging signal for indicating specification of said one of the wireless module cards 3 to the first card connector 3 based on the detecting result. In this embodiment, as shown in FIG. 2, the judging circuit 16 includes two resistors, an AND gate and a NOT gate. In actual operation, when said one of the wireless module cards 3 has a PCI-Express interface, the second card connector 13 outputs the clock request signal (CLKREQ), which is a logic-low signal, such that the judging circuit 16 outputs a logic-high signal (CPUSB) as the judging signal to the first card connector 12. On the other hand, when said one of the wireless module cards 3 has a USB interface, the second card connector 13 does not output the clock request signal (CLKREQ) such that the judging circuit 16 outputs a logic-high signal (CPPE) as the judging signal to the first card connector 12.

Figure 3:
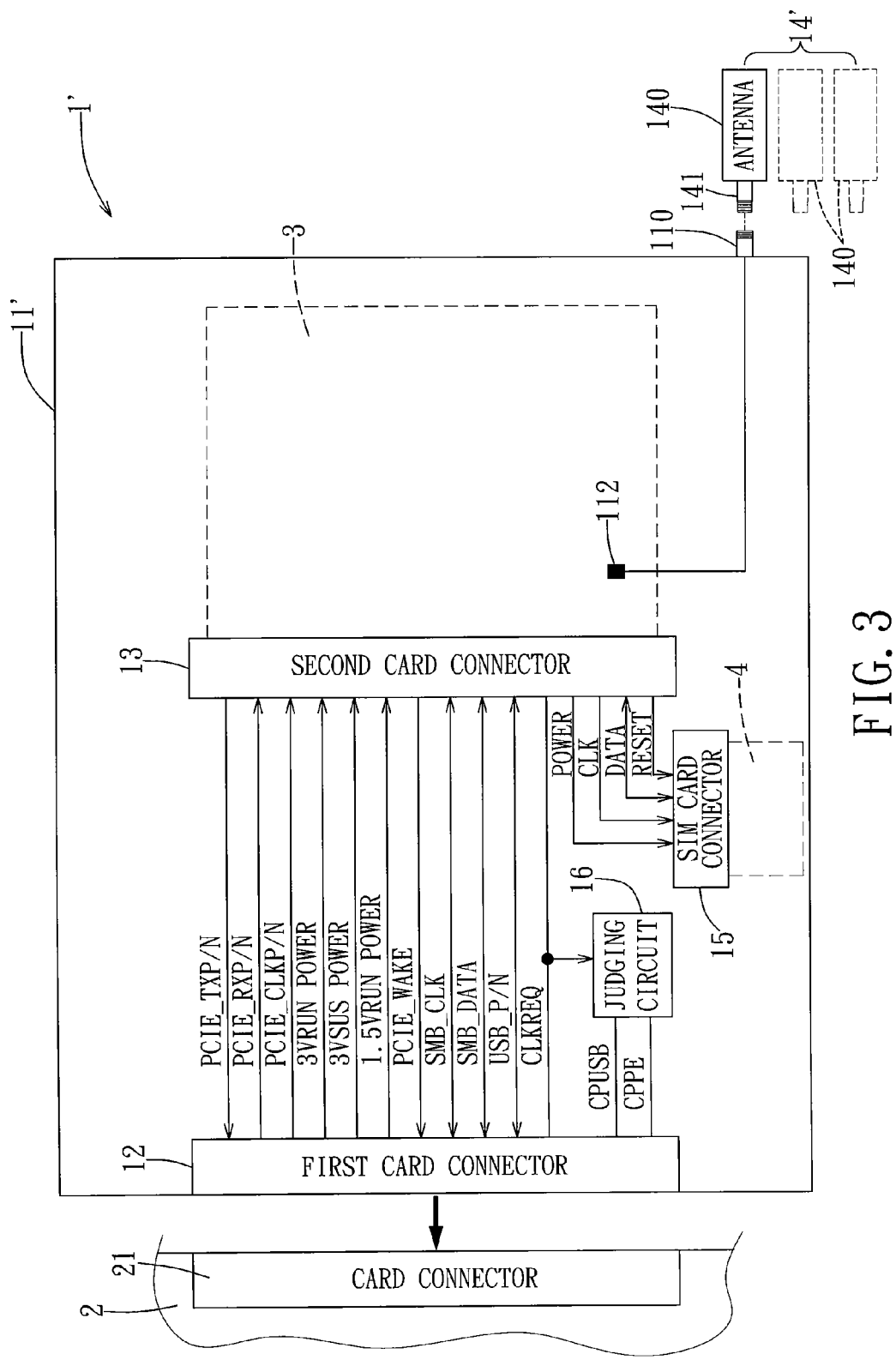
FIG. 3 is a schematic circuit block diagram illustrating the second preferred embodiment of a card connector assembly according to this invention.

FIG. 3 illustrates the second preferred embodiment of a card connector assembly 1' according to this invention, which is a modification of the first preferred embodiment.

In this embodiment, the circuit board 11' further has an antenna-connecting seat 110 connected electrically to the conductive contact 112.

The antenna unit 14' is connected detachably to the circuit board 11', and includes a plurality of antennas 140, a corresponding one of which is adapted for said one of the wireless module cards 3 and is connected detachably (such as by threaded engagement) to the antenna-connecting seat 110 of the circuit board 11'. In actual use, when said one of the wireless module cards 3 is a 3G mini card and the SIM card 4 is a 3G SIM card, the corresponding one of the antennas 140 of the antenna unit 14' is capable of transmitting/receiving a 3G signal to/from a mobile communications network. When said one of the wireless module cards 3 is a TV tuner mini card, the corresponding one of the antennas 140 of the antenna unit 14' is capable of receiving a TV channel signal. In this case, the SIM card connector 15 is not required to connect with the SIM card 4. When said one of the wireless module cards 3 is a wireless network mini card, the corresponding one of the antennas 140 of the antenna unit 14' is capable of transmitting/receiving a signal to/from a wireless network.

In sum, due to the presence of the second card connector 13, the SIM card connector 15 and the antenna unit 14, 14', the card connector assembly 1, 1' of this invention has high expansibility. Moreover, the card connector assembly 1, 1' has a compact size and is portable.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A card connector assembly adapted for use with a plurality of different wireless module cards, and a SIM card, said card connector assembly comprising:
    a circuit board;
    a first card connector mounted on a side of said circuit board and adapted to be connected electrically to a motherboard of a portable computer;
    a second card connector mounted on said circuit board, connected electrically to said first card connector, and adapted for connecting electrically with one of the wireless module cards such that the motherboard of the portable computer is able to access said one of the wireless module cards via said first and second card connectors; and
    a SIM card connector mounted on said circuit board, connected electrically to said second card connector, and adapted for connecting electrically with the SIM card.

2. The card connector assembly as claimed in claim 1, wherein said first card connector is a PCI-Express card connector capable of supporting a PCI-Express interface and a USB interface.

3. The card connector assembly as claimed in claim 1, further comprising a judging circuit mounted on said circuit board and connected electrically to said first and second card connectors, said judging circuit detecting whether said second card connector outputs a clock request signal to said first card connector when said second card connector is connected electrically to said one of the wireless module cards, and outputting a judging signal for indicating specification of said one of the wireless module cards to said first card connector based on the detecting result.

4. The card connector assembly as claimed in claim 1, further comprising an antenna-connecting seat disposed on said circuit board, adapted to be connected electrically to said one of the wireless module cards when said one of the wireless module cards is connected electrically to said second card connector, and adapted for connecting detachably to an external antenna suitable for said one of the wireless module cards.

5. The card connector assembly as claimed in claim 1, further comprising an antenna unit disposed on said circuit board and adapted to be connected electrically to said one of the wireless module cards when said one of the wireless module cards is connected electrically to said second card connector.

6. The card connector assembly as claimed in claim 5, wherein said antenna unit is a multi-frequency band antenna that is mounted on said circuit board and that is suitable for the different wireless module cards.

7. The card connector assembly as claimed in claim 5, wherein said circuit board has a conductive contact connected electrically to said antenna unit and adapted to contact electrically a corresponding conductive contact of said one of the wireless module cards when said one of the wireless module cards is connected electrically to said second card connector.

8. The card connector assembly as claimed in claim 7, wherein said antenna unit is connected detachably to said circuit board.

9. The card connector assembly as claimed in claim 8, wherein:
said circuit board further has an antenna-connecting seat connected electrically to said conductive contact; and
said antenna unit includes a plurality of antennas, a corresponding one of which is adapted for said one of the wireless module cards and is connected detachably to said antenna-connecting seat of said circuit board.

10. The card connector assembly as claimed in claim 8, said one of the wireless module cards being a 3G mini card, the SIM card being a 3G SIM card, wherein said antenna unit is capable of transmitting/receiving a 3G signal to/from a mobile communications network.

11. The card connector assembly as claimed in claim 8, said one of the wireless module cards being a TV tuner mini card, wherein said antenna unit is capable of receiving a TV channel signal.

12. The card connector assembly as claimed in claim 8, said one of the wireless module cards being a wireless network mini card, wherein said antenna unit is capable of transmitting/receiving a signal to/from a wireless network.

* * * * *